United States Patent
Biller

(10) Patent No.: US 11,964,640 B2
(45) Date of Patent: Apr. 23, 2024

(54) METHOD FOR OPERATING A BRAKE SYSTEM AND BRAKE SYSTEM

(71) Applicant: Continental Teves AG & Co. OHG, Frankfurt am Main (DE)

(72) Inventor: Harald Biller, Eschborn (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 61 days.

(21) Appl. No.: 16/899,714

(22) Filed: Jun. 12, 2020

(65) Prior Publication Data

US 2020/0307536 A1 Oct. 1, 2020

Related U.S. Application Data

(63) Continuation of application No. PCT/EP2018/081389, filed on Nov. 15, 2018.

(30) Foreign Application Priority Data

Dec. 14, 2017 (DE) ...................... 10 2017 222 789.3

(51) Int. Cl.
*B60T 17/22* (2006.01)
*B60T 13/14* (2006.01)
(Continued)

(52) U.S. Cl.
CPC ............ *B60T 13/146* (2013.01); *B60T 13/62* (2013.01); *B60T 13/686* (2013.01);
(Continued)

(58) Field of Classification Search
CPC ........ B60T 17/06; B60T 17/225; B60T 11/22; B60T 11/26; B60T 2270/403;
(Continued)

(56) References Cited

U.S. PATENT DOCUMENTS 3,727,182 A * 4/1973 Snyder .................. B60T 17/225
340/450.1
3,790,936 A * 2/1974 Knoll .................... B60T 17/225
340/450.1
(Continued)

FOREIGN PATENT DOCUMENTS

CN 101772442 A 7/2010
CN 102781740 A 11/2012
(Continued)

OTHER PUBLICATIONS

Korean Office Action dated Aug. 25, 2021, for the counterpart Korean Patent Application No. 10-2020-7016125.
(Continued)

*Primary Examiner* — Nicholas J Lane
*Assistant Examiner* — Stephen M Bowes

(57) ABSTRACT

A method for operating a brake system having a brake fluid reservoir having a first and a second reservoir chamber which are separated by a first partition wall, wherein a first filling level in the brake fluid reservoir is determined by a first sensor element, and a second filling level in the brake fluid reservoir is determined by a second sensor element, wherein the brake system is operated in a first fallback operating mode when the determined first filling level in the brake fluid reservoir falls below a first predetermined level ($p_1$), and wherein the brake system is operated in a second fallback operating mode when the determined second filling level in the brake fluid reservoir falls below a second predetermined level ($p_2$), wherein the second level ($p_2$) is lower than the first level ($p_1$), and to a brake system.

13 Claims, 3 Drawing Sheets

(51) Int. Cl.
  *B60T 13/62* (2006.01)
  *B60T 13/68* (2006.01)
  *B60T 7/04* (2006.01)

(52) U.S. Cl.
  CPC ............. *B60T 17/225* (2013.01); *B60T 7/042* (2013.01); *B60T 2270/402* (2013.01); *B60T 2270/404* (2013.01); *B60T 2270/82* (2013.01)

(58) Field of Classification Search
  CPC ...... B60T 13/146; B60T 13/62; B60T 13/686; B60T 2270/402; B60T 2270/404
  See application file for complete search history.

(56) References Cited

U.S. PATENT DOCUMENTS

| | | | |
|---|---|---|---|
| 4,550,954 A | | 11/1985 | Leiber |
| 4,741,160 A | * | 5/1988 | Leiber ..................... B60T 17/18 60/565 |
| 2004/0061375 A1 | | 4/2004 | Drott et al. |
| 2004/0245848 A1 | | 12/2004 | Fraisse et al. |
| 2007/0108836 A1 | | 5/2007 | Feigel |
| 2012/0038209 A1 | | 2/2012 | Yamamoto |
| 2012/0313427 A1 | | 12/2012 | Hatano |
| 2013/0218407 A1 | | 8/2013 | Jungbecker et al. |
| 2015/0025767 A1 | | 1/2015 | Feigel |
| 2017/0015290 A1 | * | 1/2017 | Oosawa ................ B60T 13/146 |
| 2018/0297569 A1 | | 10/2018 | Oosawa |

FOREIGN PATENT DOCUMENTS

| | | | | |
|---|---|---|---|---|
| CN | 103167977 A | | 6/2013 | |
| CN | 104169141 A | | 11/2014 | |
| DE | 2720595 A1 | * | 11/1978 | ............. G01F 23/56 |
| DE | 19958193 A1 | * | 6/2001 | ............. B60T 11/26 |
| DE | 10147181 A1 | | 12/2002 | |
| DE | 102004022993 A1 | | 12/2005 | |
| DE | 102011081240 A1 | | 4/2012 | |
| DE | 112008002155 B4 | | 11/2012 | |
| DE | 102013203594 A1 | | 9/2013 | |
| DE | 102012219390 A1 | | 4/2014 | |
| DE | 102013219578 A1 | | 4/2015 | |
| EP | 0111672 B1 | | 6/1984 | |
| EP | 1441939 B1 | | 8/2004 | |
| EP | 2520473 A1 | | 11/2012 | |
| GB | 1600703 A | * | 10/1981 | ......... B60G 17/0164 |
| JP | 2009040359 A | | 2/2009 | |
| JP | 2009113605 A | | 5/2009 | |
| JP | 4350947 B2 | | 10/2009 | |
| KR | 2003085853 A | * | 11/2003 | ............. B60T 17/06 |
| KR | 20130130717 A | | 12/2013 | |
| KR | 20140132752 A | | 11/2014 | |
| WO | 2005/014352 A1 | | 2/2005 | |
| WO | WO-2011002594 A1 | * | 1/2011 | ............ B60T 17/225 |
| WO | 2017153470 A1 | | 9/2017 | |

OTHER PUBLICATIONS

Chinese Office Action dated Dec. 22, 2021 for the counterpart Chinese Patent Application No. 201880079552.2.
International Search Report and Written Opinion dated May 8, 2019 from corresponding International Patent Application No. PCT/EP2018/081389.
Search Report dated Feb. 8, 2021 from corresponding German Patent Application No. DE 10 2017 222 789.3.
Chinese Second Office Action dated Jun. 20, 2022 for the counterpart Chinese Patent Application No. 201880079552.2.
Korean Intellectual Property Office Written Decision on Registration dated Aug. 23, 2022 for the counterpart Korean Application No. 10-2020-7016125.

* cited by examiner

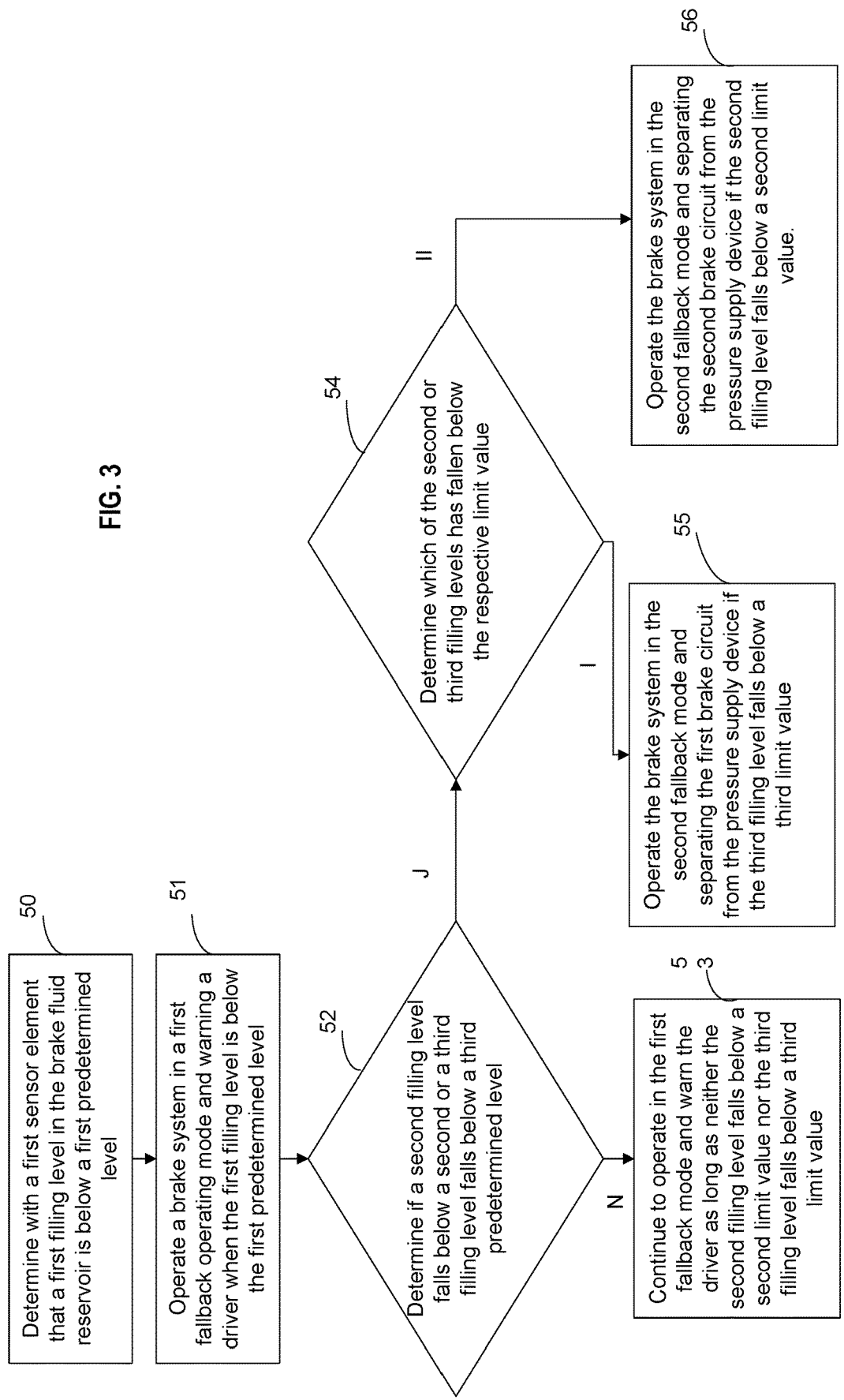

US 11,964,640 B2

METHOD FOR OPERATING A BRAKE SYSTEM AND BRAKE SYSTEM

CROSS REFERENCE TO RELATED APPLICATIONS

This application claims priority to PCT International Application No. PCT/EP2018/081389, filed Nov. 15, 2018, which claims priority to German Patent Application No. DE 10 2017 222 789.3, filed Dec. 14, 2017, wherein the contents of such applications are incorporated herein by reference.

TECHNICAL BACKGROUND

WO 2005/014 352 A1 discloses a brake system which comprises a brake pressure transmitter which can be actuated by a brake pedal, a pressure medium supply reservoir and at least one electrohydraulic pressure source. The pressure medium supply reservoir comprises a first and a second chamber, wherein the pressure source is connected to the first chamber, and the brake pressure transmitter is connected to the second chamber. The separation of the brake pressure transmitter and the pressure source is intended to impart a comfortable pedal feel during a "brake-by-wire" operating mode. Means for determining the pressure medium level in the first and second chamber are provided.

DE 101 47 181 A1 describes a filling level measuring device for a pressure medium supply reservoir.

The known prior art has the disadvantage that, although the pressure medium level can be monitored, it remains unknown in the event of a pressure medium loss how or where this has occurred and how a further loss can be prevented. It is therefore not possible for the brake system to be safely operated after a pressure medium loss has been determined.

What is needed is a method and a brake system by which continued safe operation (ensuring a braking action) of the brake system can occur after determining a lowering of the brake fluid in the reservoir, for example on account of a leakage of unknown origin.

BRIEF DESCRIPTION OF THE FIGURES

FIG. 3 shows a flow diagram of an exemplary method.

DETAILED DESCRIPTION OF THE EMBODIMENTS

Figure 1:
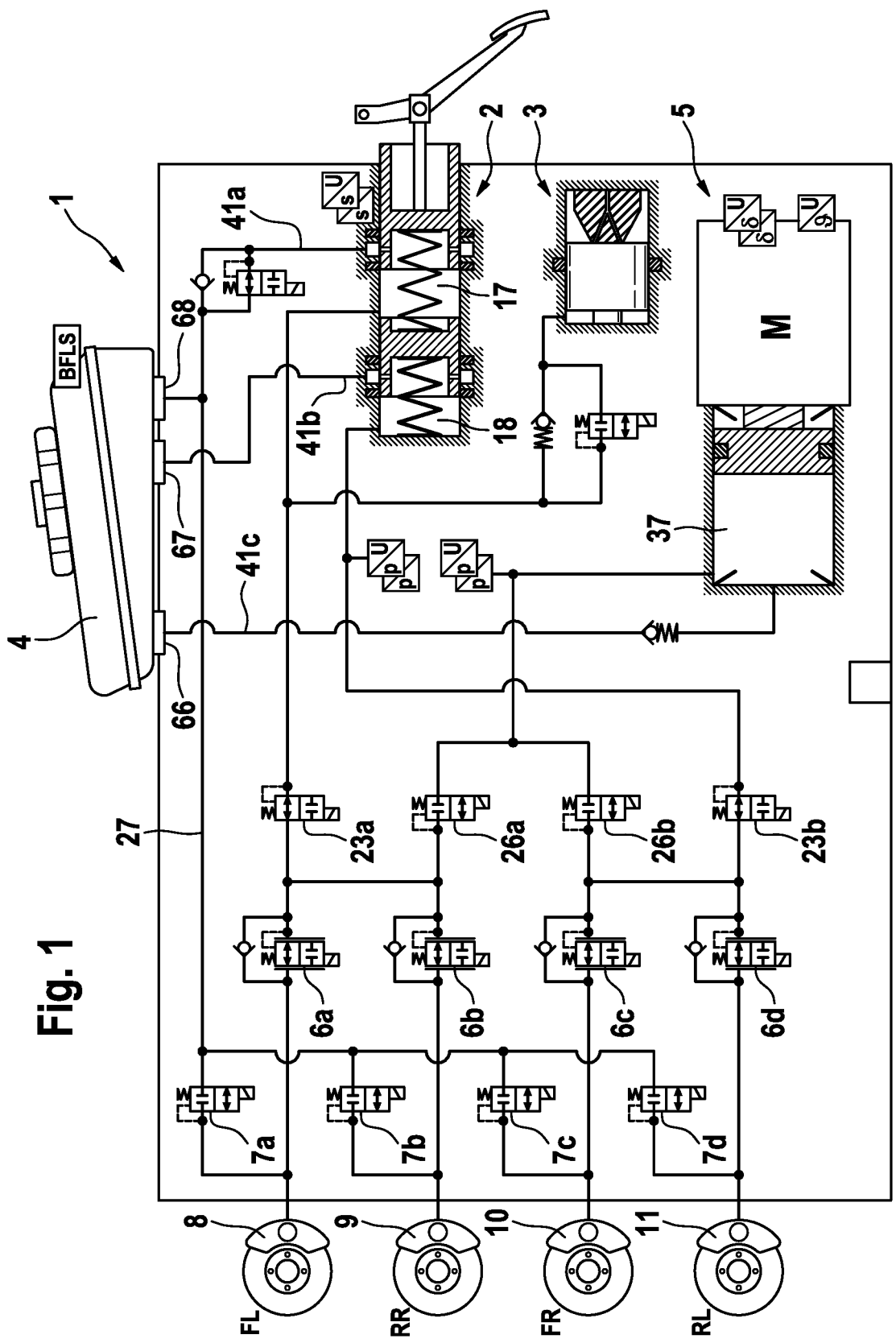
FIG. 1 shows an exemplary brake system.

FIG. 1 shows an exemplary embodiment of a brake system according to the invention for a motor vehicle. The brake system comprises a master brake cylinder 2 having two pressure spaces 17 and 18. The master brake cylinder 2 is actuated by the driver of the motor vehicle via a brake pedal. The master brake cylinder 2 is connected to a pressure medium supply reservoir 4 and is supplied with pressure medium therefrom. Here, each of the pressure spaces 17, 18 has a dedicated port 67, 68 connected to the pressure medium supply reservoir 4.

Figure 2:
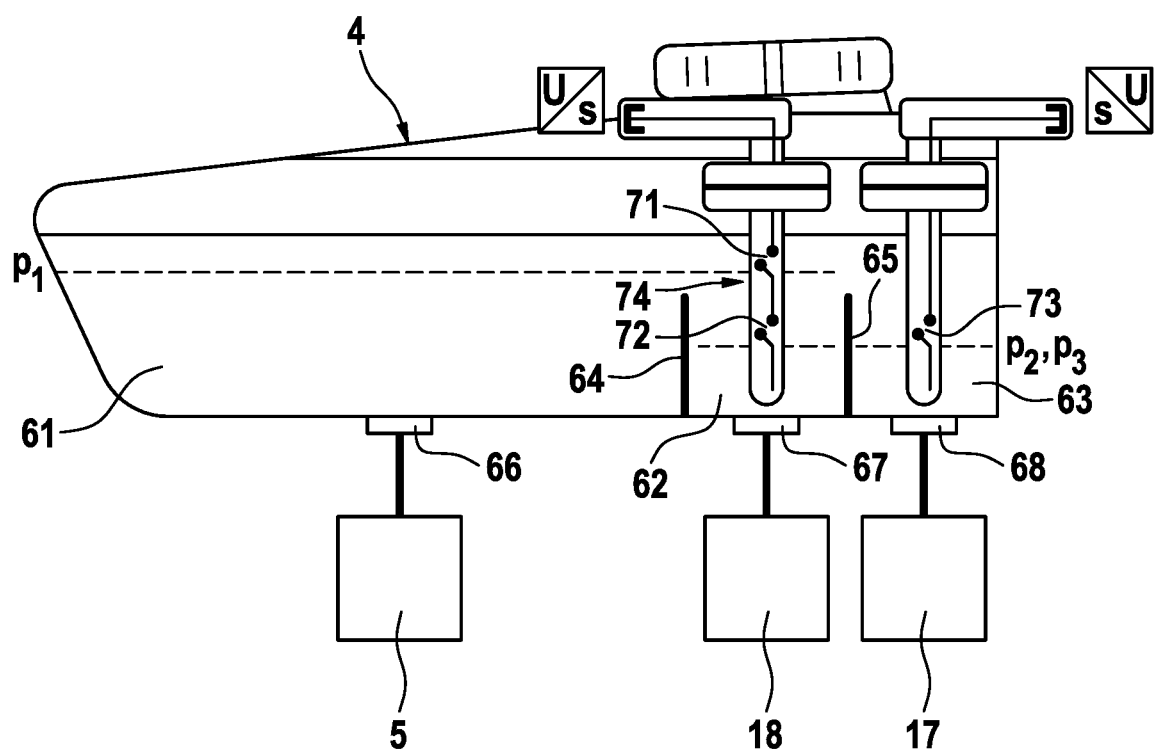
FIG. 2 shows the brake fluid reservoir of FIG. 1 in detail.

The pressure medium supply reservoir 4 is shown in detail in FIG. 2.

The first pressure space 17 of the master brake cylinder 2 is connected via a first isolation valve 23a to a first brake circuit to which the first and the second wheel brake 10, 11 are connected. According to the example, the first isolation valve 23a is configured to be normally open. Here, the first and second wheel brake 8, 9 are expediently connected via a respective inlet valve 6a, 6b.

The second pressure space 18 of the master brake cylinder 2 is connected via a second isolation valve 23b to a second brake circuit to which the third and the fourth wheel brake 10, 11 are connected. According to the example, the second isolation valve 23b is configured to be normally open. Here, the third and fourth wheel brake 10, 11 are expediently connected via a respective inlet valve 6c, 6d.

The brake system also comprises a pressure supply device 5. According to the example, the pressure supply device 5 comprises a motor by which a piston can be displaced in a hydraulic pressure supply device pressure space 37 (PSD pressure space), with the result that a pressure can be built up. The pressure supply device 5 is connected via a connection 41c to the pressure medium supply reservoir 4 and is supplied with pressure medium therefrom.

According to the example, the pressure supply device 5 is separably connected via a first sequence valve 26a to the first and second wheel brake 8, 9 and separably connected via a second sequence valve 26b to the third and the fourth wheel brake 10, 11.

According to the example, the brake system can be operated in a normal operation which corresponds to a so-called "by-wire" operation. In normal operation, the first and the second isolation valve 23a, 23b are closed, with the result that the master brake cylinder 2 is decoupled from the wheel brakes 8, 9, 10, 11. The sequence valves 26a, 26b are opened and pressure in the wheel brakes is generated by the pressure supply device 5.

Pressure buildup by the pressure supply device 5 can be carried out in normal operation even independently of an actuation of the brake pedal.

Brake pressure can be reduced at the wheel brakes 8, 9, 10, 11 by opening outlet valves 7a, 7b, 7c, 7d, via which the wheel brakes 8, 9, 10, 11 are connected to a common return line 27 and, via the latter, to the pressure medium supply reservoir 4.

Alternatively, it is possible to provide separate return lines, with advantageously the first and second wheel brake 8, 9 being connected to a first return line and the third and fourth wheel brake 10, 11 being connected to a second return line. The return lines are connected to different chambers of the brake fluid reservoir.

The inlet valves 6a, 6b, 6c, 6d are individually switchable to set different pressures in the wheel brakes. Braking control functions known per se (for example EBV, ABS, ASR, ESC, ACC, etc.) can be carried out by the brake system.

The brake system can be operated in a first fallback operating mode. For this purpose, according to the example, the pressure supply device 5 is separated from the wheel brakes 8, 9, 10, 11 by virtue of the sequence valves 26a, 26b being closed. The master brake cylinder 2 is connected to the wheel brakes 8, 9, 10, 11 by virtue of the isolation valves 23a, 23b being opened such that brake pressure is provided in the wheel brakes 8, 9, 10, 11 by the master brake cylinder 2. Here, the pressure supply device 5 is not used for pressure buildup.

Furthermore, the brake system can also be operated in a second fallback operating mode in which, according to the example, the master brake cylinder 2 is separated from the wheel brakes 8, 9, 10, 11 by closing the isolation valves 23a, 23b, and the pressure supply device 5 is connected to at least some of the wheel brakes by virtue of the first sequence valve 26a and/or the second sequence valve 26b being opened. Brake pressure for actuating some of the wheel brakes is provided by the pressure supply device 5. Here, brake pressure in the first and second wheel brake 8, 9 is provided by the pressure supply device by virtue of the first sequence valve 26a being opened, or brake pressure in the third and fourth wheel brake 10, 11 is provided by the pressure supply device by virtue of the second sequence valve 26b being opened, or pressure in all four wheel brakes is provided by virtue of both the first and the second sequence valve 26a, 26b being opened. Depending on the design of the sequence valves, it can be advantageous to close, with a sequence valve, the respectively associated inlet valves at the same time. This is advantageous particularly when a pressure in the pressure supply device exerts an opening action on the sequence valves.

According to the example, the first and second wheel brake 8, 9 are arranged on different vehicle sides, for example on a diagonal. Accordingly, the third and fourth wheel brake 10, 11 are also arranged on different vehicle sides. For example, the third wheel brake 10 is the front right wheel brake (FR), the fourth wheel brake 11 is the rear left wheel brake (RL), the first wheel brake 8 is the front left wheel brake (FL), and the second wheel brake 9 is the rear right wheel brake (RR). Other arrangements are also possible.

According to the example, in the first and in the second fallback operating mode, the outlet valves 7a, 7b, 7c, 7d of the wheel brakes are kept closed, with the result that a displacement of pressure medium between the chambers of the pressure medium supply reservoir 4, and thus between the brake circuits, is prevented. According to the example, control functions which bring about opening of the outlet valves are switched off.

If separate return lines are provided, it is possible for control functions which require opening of the outlet valves to remain partially switched on if no displacement of pressure medium between the chambers of the pressure medium supply reservoir 4 is caused thereby. However, because it is not to be expected of the driver to release and subsequently depress the brake pedal, in the first fallback operating mode, for only those control functions to remain switched on by which only a small part of the pressure medium in the master brake cylinder is used, that is to say substantially the electronic brake force distribution EBV.

FIG. 2 shows an exemplary brake fluid reservoir 4 which is suitable for carrying out the method. According to the example, the brake fluid reservoir is part of a brake system as shown in FIG. 1.

According to the example, the brake fluid reservoir 4 comprises three reservoir chambers which are separated by partition walls. Here, the first reservoir chamber 61 is separated from the second reservoir chamber 62 by the partition wall 64. The second reservoir chamber 62 is separated from the third reservoir chamber 63 by the second partition wall 65. The reservoir chambers are connected above the partition walls. The reservoir chambers are thus advantageously connected when the filling level is above the partition walls, and separated as soon as the filling level drops below the upper edges of the partition walls.

Each of the reservoir chambers 61, 62, 63 has a port 66, 67, 68 for fluid removal.

The first reservoir chamber 61 is connected to the pressure supply device 5 via a first port 66 for fluid removal. The second reservoir chamber 62 is connected to the second pressure space 18 of the master brake cylinder via a second port 67 for fluid removal. The third reservoir chamber 63 is connected to the first pressure space 17 of the master brake cylinder via a third port 68 for fluid removal.

A first sensor element 71 is arranged above the partition walls 64, 65 and detects the filling level in the whole brake fluid reservoir. A second sensor element 72 is arranged in the second reservoir chamber 62 and detects the filling level in the second reservoir chamber 62.

According to the example, the first and the second sensor element 71, 72 are arranged in a common sensor device 74.

A third sensor element 73 is arranged in the third reservoir chamber 63 and detects the filling level in the third reservoir chamber. Alternatively, the first and the third sensor element can be arranged in a common sensor device.

FIG. 3 shows a flow diagram of an exemplary method.

In step 50, a first sensor element 71 is used to determine that the filling level in the brake fluid reservoir 4 has dropped below a limit value. In step 51, the driver is now warned and the brake system is operated in the first fallback operating mode.

In the first fallback operating mode, the pressure supply device 5 is separated from the wheel brakes 8, 9, 10, 11 by closing the sequence valves 26a, 26b, and pressure in the wheel brakes 8, 9, 10, 11 is provided by the master brake cylinder 2. Here, pressure in the first brake circuit is provided by the first pressure space 17, and pressure in the second brake circuit is provided by the second pressure space 18.

In a step 52, monitoring is carried out to establish whether the filling level falls below a second or third predetermined level, that is to say whether a further drop in the filling level is determined. For this purpose, a second filling level in the second chamber 62 of the brake fluid reservoir 4 is determined by a second sensor element 72, and a third filling level in the third chamber 63 of the brake fluid reservoir 4 is determined by a third sensor element 73. As long as neither the second filling level falls below a second limit value nor the third filling level falls below a third limit value, the brake system continues to be operated in the first fallback operating mode.

If either the second filling level falls below the second limit value or the third filling level falls below the third limit value, there is a continuation with step 53. The driver continues to be warned or is warned again.

In step 54, it is determined which of the filling levels (second or third) has fallen below the respective limit value. If the third filling level has fallen below the third limit value, a leakage within the first brake circuit is assumed and there is a continuation with step 56. If the second filling level has fallen below the second limit value, a leakage within the second brake circuit is assumed and there is a continuation with step 57.

In step 56, the brake system passes into the second fallback operating mode, wherein pressure is provided by the pressure supply device 5, and the first brake circuit is separated from the pressure supply device 5 by switching the first sequence valve 26a and, where appropriate, the associated inlet valves 6a, 6b.

In step 57, the brake system passes into the second fallback operating mode, wherein pressure is provided by the pressure supply device 5, and the second brake circuit is separated from the pressure supply device 5 by switching the second sequence valve 26b and, where appropriate, the associated inlet valves 6c, 6d.

The fallback operation of the brake system is maintained until maintenance on the brake system or repair of the leakage is carried out.

A further exemplary method will be described below.

A second and a third sensor element (for example reservoir warning device) are present which are assigned to the reservoir chambers 62, 63 from which the master brake cylinder 2 is supplied, and respond only when the liquid level in the respective reservoir chamber 62, 63 has dropped significantly below the partition walls 64, 65.

The first sensor element 71 is advantageously combined with one of the two additional sensor elements 72, 73. There is a one-stage sensor device for one of the two reservoir chambers 63 and a two-stage sensor device whose second stage 72 monitors the fluid level in the other reservoir chamber 62 and whose first stage 71 monitors a fluid level above the partition walls 64, 65 of the reservoir 4.

The operating strategy for avoiding the fallback level with circuit failure is as follows. If, as a result of an external leakage, the level of the brake fluid in the brake fluid reservoir 4 falls below the upper warning threshold $p_1$, the driver is warned by a red indicator, and the brake system passes into a hydraulic fallback level in which pressure supply in the wheel brakes 8, 9, 10, 11 occurs via the master brake cylinder 2. The two brake circuits are still safely available at this time. The electronic brake force distribution (EBV) and all higher control functions are switched off because brake fluid is displaced between the circuits via the common return line 27 of the four outlet valves. Alternatively, the EBV can be maintained if the hydraulic circuit diagram of FIG. 1 is changed in such a way that the common return line 27 of the outlet valves is omitted and each outlet valve is connected to the associated reservoir chamber. The outlet valves 7a, 7b of the first and second wheel brake 8, 9 are connected via a first return line to the third port 68 and that the outlet valves 7c, 7d of the third and fourth wheel brake 10, 11 are connected via a second return line to the second port 67.

For certain external leakages (for example via the sleeve of the pressure supply device, which is configured as a linear actuator), the liquid level in the brake fluid reservoir 4 does not drop further. However, if the fluid level also falls below the lower warning threshold $p_2$, $p_3$ in one of the two reservoir chambers 62, 63, the system passes again into a by-wire operation, wherein the inlet valves and the sequence valve are closed in the circuit with the low fluid level. All control functions are switched off. The closure of the inlet valves and of the sequence valve avoids a further fluid loss. The increased single-circuit operation with red driver warning can be maintained until a repair is carried out.

The brake system is operated in a first fallback operating mode when the determined first filling level in the brake fluid reservoir falls below a first predetermined level. The brake system is operated in a second fallback operating mode when the determined second filling level in the brake fluid reservoir falls below a second predetermined level, wherein the second level is lower than the first level. This has the advantage that the operating mode of the brake system is adapted to the leakage that has occurred.

The first sensor element detects the first filling level in a first region, wherein the first region is situated above the first partition wall. The first and second reservoir chamber are connected to one another above the first partition wall. The first sensor element thus determines the filling level in the whole brake fluid reservoir.

The second sensor element detects the second filling level in a second region, wherein the second region is situated in the second reservoir chamber. The second region is thus situated at a height at which the first and the second reservoir chamber are separated by the first partition wall, and the second sensor element detects the filling level only within the second reservoir chamber.

According to a first embodiment, the first and the second sensor element are configured to be separate.

According to a second, alternative embodiment, the first and second sensor element are arranged in a common sensor device. For example, the sensor device consists of at least two reed contacts, which function as sensor elements, and of a common float having an integrated magnet whose position is detected by the reed contacts. This has the advantage that the sensor device is inexpensive and space-saving.

In the first fallback operating mode, the pressure supply device is separated from the wheel brakes and the master brake cylinder is connected to the wheel brakes, with the result that brake pressure in the wheel brakes is provided by the master brake cylinder. This occurs upon an actuation of the brake pedal by the driver, that is to say upon a request for brake pressure by the driver.

In the second fallback operating mode, the master brake cylinder is separated from the wheel brakes and the pressure supply device is connected to at least some of the wheel brakes, and brake pressure for actuating some of the wheel brakes is provided by the pressure supply device. What is meant here by at least some of the wheel brakes is a subset of the wheel brakes or the set of all the wheel brakes (for example, first, second, third and fourth wheel brake). With particular preference, this occurs upon an actuation of the brake pedal by the driver, that is to say upon a request for brake pressure by the driver.

In the second fallback operating mode, a first and a second wheel brake are hydraulically separated from the pressure supply device. It is thus possible to prevent a pressure medium loss in the event of a leakage in the region of the first or second wheel brake.

In the second fallback operating mode, a first wheel brake is hydraulically separated from the pressure supply device. It is thus possible to prevent a pressure medium loss in the event of a leakage in the region of the first wheel brake.

According to an embodiment, the master brake cylinder comprises a first and a second pressure space, wherein the second pressure space is connected to the second port. The brake fluid reservoir comprises a third reservoir chamber which is separated by a second partition wall, wherein the first pressure space is connected to the third reservoir chamber via a port for fluid removal, and a third filling level is detected in the brake fluid reservoir by a third sensor element.

The first pressure space is advantageously separably connected to a first brake circuit, wherein at least one of the wheel brakes is connected to the first brake circuit. The second pressure space is separably connected to a second brake circuit, wherein at least one other of the wheel brakes is connected to the second brake circuit. The pressure supply device is separably connected to the first brake circuit and to the second brake circuit.

A first and a second wheel brake of the wheel brakes are connected to the first brake circuit, and a third and fourth wheel brake of the wheel brakes are connected to the second brake circuit.

The third sensor element preferably detects the third filling level in a third region, wherein the third region is situated in the third reservoir chamber. The third region is thus at a height at which the third reservoir chamber is separated by the second partition wall from the other reservoir chambers (first and second reservoir chamber), and the third sensor element consequently detects the filling level only within the third reservoir chamber.

The first region is advantageously also situated above the second partition wall. In this way, the first sensor element detects the filling level in the whole brake fluid reservoir above the partition walls.

The brake system is advantageously operated in the second fallback operating mode when the determined third filling level in the brake fluid reservoir falls below a third predetermined level.

In the second fallback operating mode, the first brake circuit is hydraulically separated from the pressure supply device if the determined third filling level in the brake fluid reservoir falls below the third predetermined level, and the second brake circuit is hydraulically separated from the pressure supply device if the determined second filling level in the brake fluid reservoir falls below the second predetermined level.

In the first fallback operating mode, all those control functions by which pressure medium is transferred from one of the reservoir chambers into another of the reservoir chambers are switched off. This ensures a closed circuit for each reservoir chamber and prevents a further loss of pressure medium.

In the second fallback operating mode, all those control functions by which pressure medium is transferred from one of the reservoir chambers into another of the reservoir chambers are switched off.

A warning to the driver is advantageously output when the first filling level in the brake fluid reservoir falls below the first level, and a further warning to the driver is output when the second filling level falls below the second level or the third filling level falls below the third level. In particular, the warning indicates to the driver that the brake system has a leakage and maintenance is necessary.

The embodiments also relate to a brake system in which a method according to the invention is carried out.

Furthermore, the embodiments relate to a brake system in which the first sensor element is situated above the first partition wall, and the second sensor element is situated in the second reservoir chamber.

The invention claimed is:

1. A method for operating a brake system having hydraulically actuatable wheel brakes, which comprises an electrically controllable pressure supply device, which is separably connected to the wheel brakes, a master brake cylinder which can be actuated by a brake pedal and which is separably connected to the wheel brakes, and a brake fluid reservoir having a first and a second reservoir chamber which are separated by a first partition wall, wherein the first reservoir chamber is connected to the pressure supply device via a first port for fluid removal, via which the pressure supply device is supplied with pressure medium, and the second reservoir chamber is connected to the master brake cylinder via a second port for fluid removal, via which the master brake cylinder is supplied with pressure medium, wherein a first filling level in the brake fluid reservoir is determined by a first sensor element, and a second filling level in the brake fluid reservoir is determined by a second sensor element, wherein the second sensor element detects the second filling level in a second region, wherein the second region is situated in the second reservoir chamber, the method comprising:

operating the brake system in a first fallback operating mode by separating the pressure supply device from the wheel brakes and connecting the master brake cylinder to the wheel brakes such that brake pressure in the wheel brakes is provided by the master brake cylinder when the determined first filling level in the brake fluid reservoir falls below a first predetermined level ($p_1$); and operating the brake system in a second fallback operating mode when the determined second filling level in the brake fluid reservoir falls below a second predetermined level ($p_2$), wherein the second level ($p_2$) is lower than the first level ($p_1$).

2. The method as claimed in claim 1, wherein the first sensor element detects the first filling level in a first region, wherein the first region is situated above the first partition wall.

3. The method as claimed in claim 1, wherein the first and the second sensor element are configured to be separate, or in that the first and second sensor element are arranged in a common sensor device.

4. The method as claimed in claim 1, wherein, in the second fallback operating mode, the master brake cylinder is separated from the wheel brakes and the pressure supply device is connected to at least some of the wheel brakes, and brake pressure for actuating some of the wheel brakes is provided by the pressure supply device.

5. The method as claimed in claim 1, wherein, in the second fallback operating mode, a first and/or a second wheel brake of the wheel brakes are/is hydraulically separated from the pressure supply device.

6. The method as claimed in claim 1, wherein the master brake cylinder comprises a first and a second pressure space, wherein the second pressure space is connected to the second port, in that the brake fluid reservoir comprises a third reservoir chamber which is separated by a second partition wall, wherein the first pressure space is connected to the third reservoir chamber via a third port for fluid removal, and in that a third filling level in the brake fluid reservoir is detected by a third sensor element.

7. The method as claimed in claim 6, wherein the third sensor element detects the third filling level in a third region, wherein the third region is situated in the third reservoir chamber.

8. The method as claimed in claim 6, wherein the first region is situated above the second partition wall.

9. The method as claimed in claim 6, wherein the first pressure space is separably connected to a first brake circuit, wherein at least one of the wheel brakes is connected to the first brake circuit, and in that the second pressure space is separably connected to a second brake circuit, wherein at least one other of the wheel brakes is connected to the second brake circuit, and in that the pressure supply device is separably connected to the first brake circuit and the pressure supply device is separably connected to the second brake circuit.

10. The method as claimed in claim 9, wherein the brake system is operated in the second fallback operating mode when the determined third filling level in the brake fluid reservoir falls below a third predetermined level ($p_3$).

11. The method as claimed in claim 10, wherein, in the second fallback operating mode, the first brake circuit is hydraulically separated from the pressure supply device if the determined third filling level in the brake fluid reservoir falls below the third predetermined level ($p_3$), and the second brake circuit is hydraulically separated from the pressure supply device if the determined second filling level in the brake fluid reservoir falls below the second predetermined level ($p_2$).

12. A brake system comprising:
hydraulically actuatable wheel brakes, which comprises an electrically controllable pressure supply device, which is separably connected to the wheel brakes;
a master brake cylinder which can be actuated by a brake pedal and which is separably connected to the wheel brakes;
a brake fluid reservoir having a first and a second reservoir chamber which are separated by a first partition wall;
wherein the first reservoir chamber is connected to the pressure supply device via a first port for fluid removal, via which the pressure supply device is supplied with pressure medium, and the second reservoir chamber is connected to the master brake cylinder via a second port for fluid removal, via which the master brake cylinder is supplied with pressure medium;
the brake fluid reservoir comprises a first sensor element for determining a first filling level, and the brake fluid reservoir comprises a second sensor element for determining a second filling level, wherein the first sensor element detects the first filling level in a first region situated above the first partition wall, and wherein the second sensor element detects the second filling level in a second region situated in the second reservoir chamber;
the brake system is operated in a first fallback operating mode when the determined first filling level in the brake fluid reservoir falls below a first predetermined level ($p_1$), and in that the brake system is operated in a second fallback operating mode when the determined second filling level in the brake fluid reservoir falls below a second predetermined level ($p_2$);
wherein the pressure supply device is separated from the wheel brakes and connects the master brake cylinder to the wheel brakes in the first fallback operating mode such that brake pressure in the wheel brakes is provided by the master brake cylinder; and
the second level ($p_2$) is lower than the first level ($p_1$).

13. The brake system as claimed in claim 12, wherein the master brake cylinder comprises a first and a second pressure space, wherein the second pressure space is connected to the second port, in that the brake fluid reservoir comprises a third reservoir chamber which is separated by a second partition wall, wherein the first pressure space is connected to the third reservoir chamber via a third port for fluid removal, and in that the brake fluid reservoir comprises a third sensor element for determining a third filling level, and in that the first pressure space is separably connected to a first brake circuit via a first isolation valve, wherein a first and a second wheel brake are connected to the first brake circuit, and in that the second pressure space is separably connected via a second isolation valve to a second brake circuit, wherein a third and a fourth wheel brake are connected to the second brake circuit, and in that the pressure supply device is connected via a first sequence valve to the first brake circuit, and the pressure supply device is separably connected via a second sequence valve to the second brake circuit.

\* \* \* \* \*